Sept. 6, 1966　　　F. A. CIAMPA ETAL　　　3,270,354
FURNITURE SPRING ASSEMBLY
Filed Jan. 7, 1965　　　　　　　　　　　　6 Sheets-Sheet 3
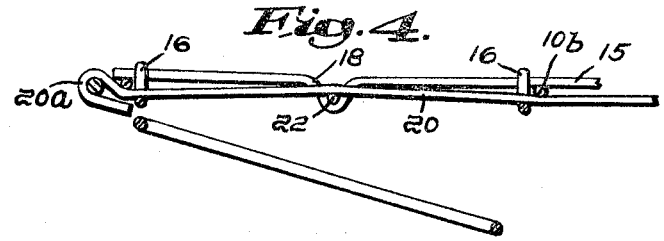
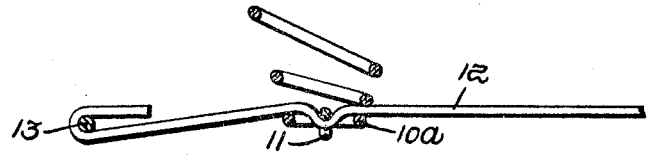
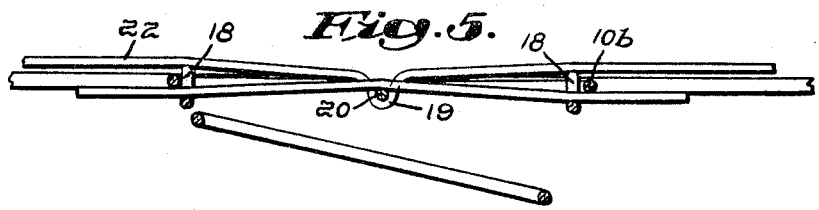
Inventors:
Fred A. Ciampa,
Angelo Serafini,
Louis Mazzarella,
by Arthur D. Thomson
Attorney

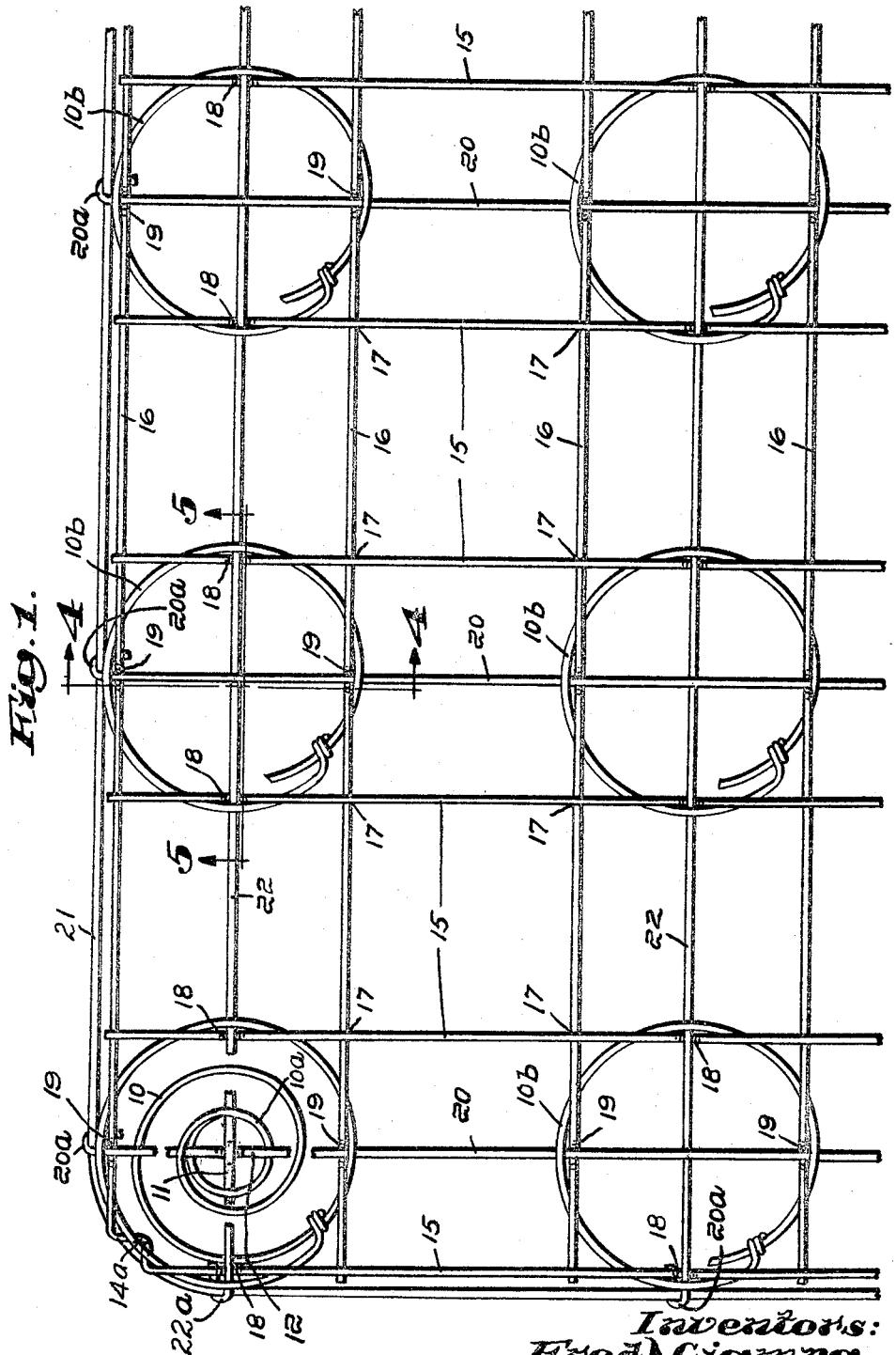

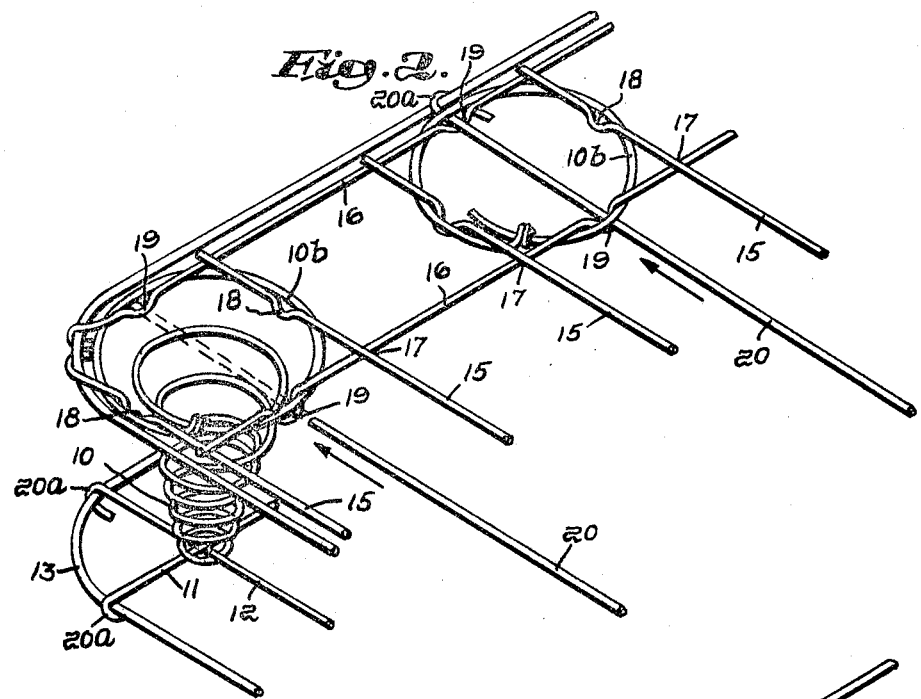
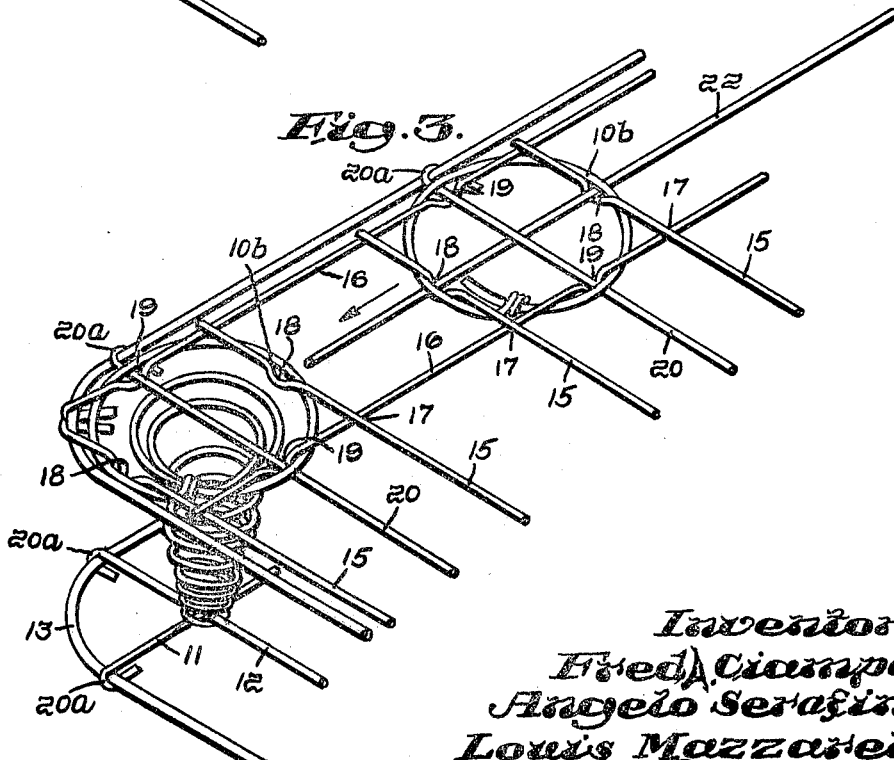

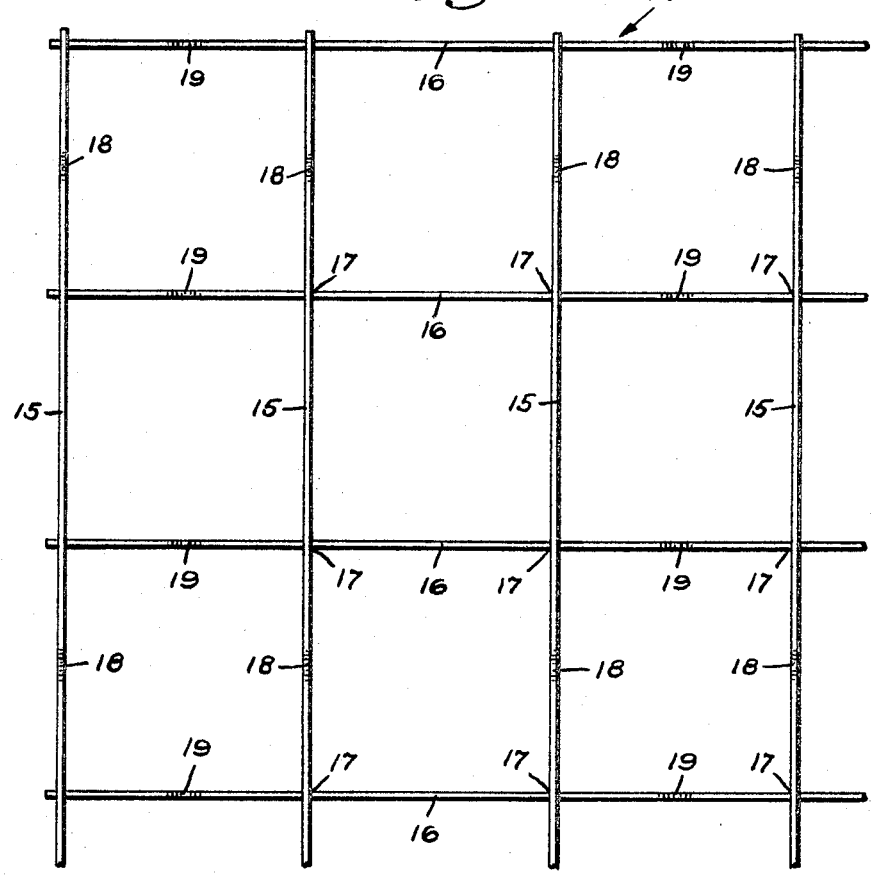

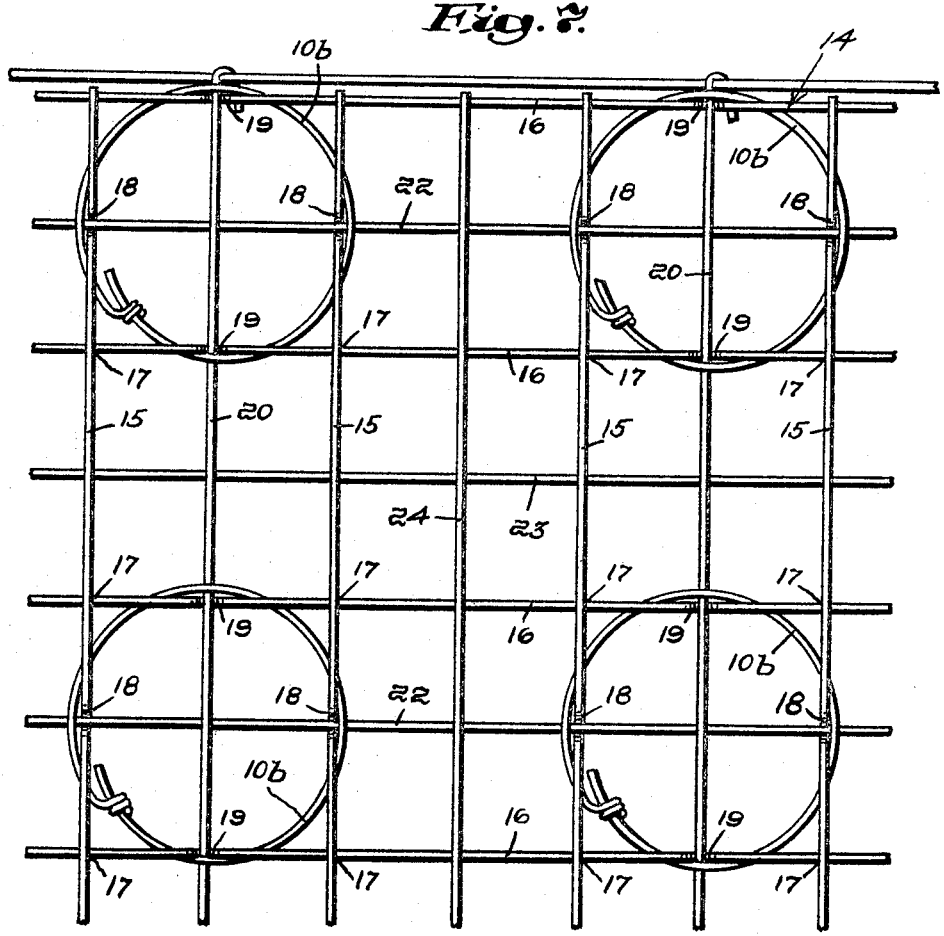

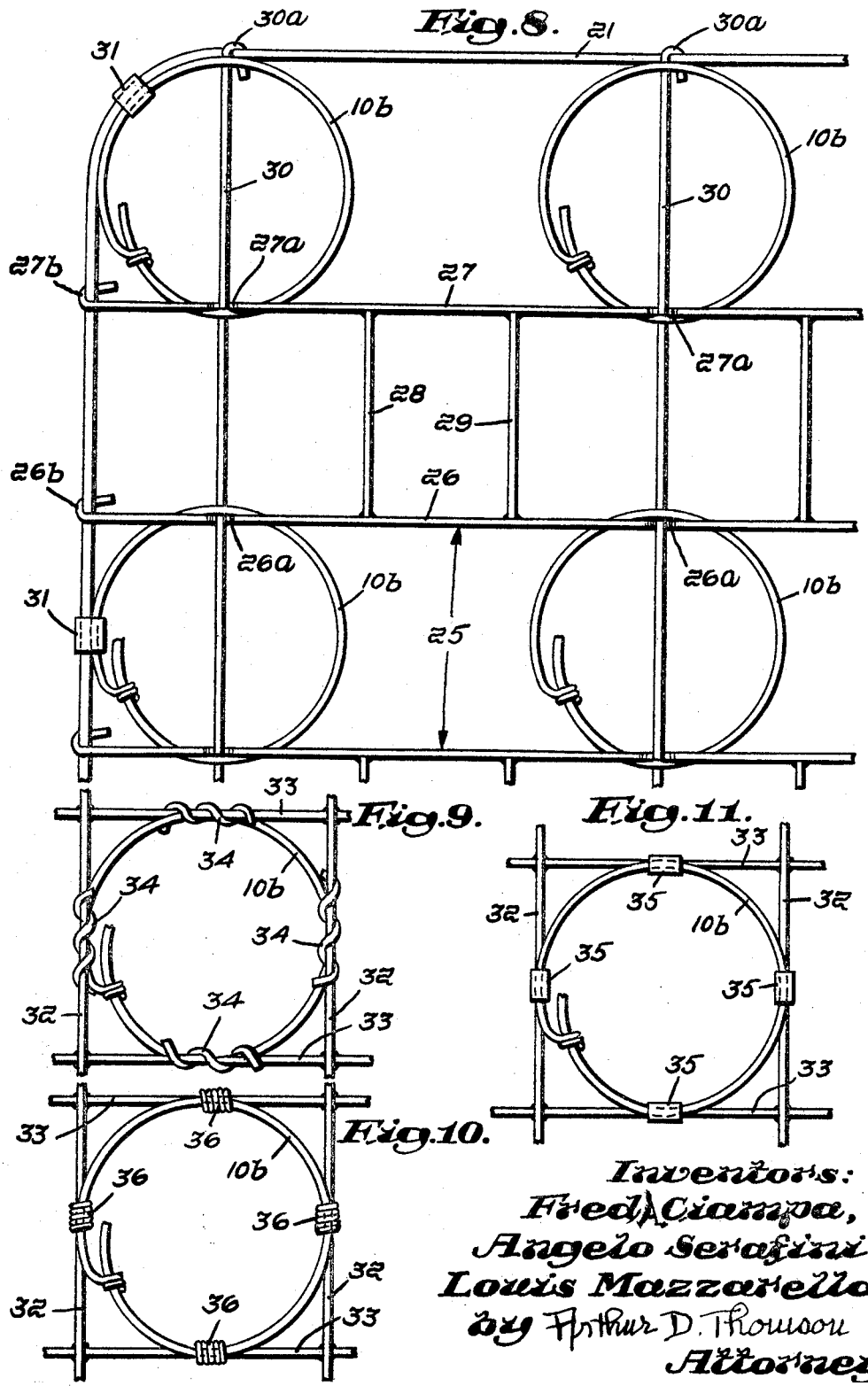

United States Patent Office 3,270,354
Patented Sept. 6, 1966

3,270,354
FURNITURE SPRING ASSEMBLY
Fred A. Ciampa and Angelo Serafini, East Boston, and Louis Mazzarella, Boston, Mass., assignors to Standard Box Spring Co., East Boston, Mass., a corporation of Massachusetts
Filed Jan. 7, 1965, Ser. No. 424,100
8 Claims. (Cl. 5—260)

This application is a continuation-in-part of our previous application Serial No. 382,757, filed July 15, 1964, now abandoned.

This invention relates to box springs, and more particularly to construction and assembly of the top portion of a box spring or inner spring for use in bedding or other items of upholstered furniture.

A typical top assembly for a box spring or inner spring consists of top wires laid in pairs over the rows of coils both longitudinally and transversely, and links with hook like ends connecting the wires together between adjacent coils in both directions. The top structure is assembled by hand, by laying the top wires in place and hooking the links one at a time under the top turns of the coils and around the top wires. The border coils are secured to the border wire by clips which are clamped on with a special tool. The assembly of a spring in this manner is time consuming and fatiguing and requires a considerable skill and manual dexterity. If a link is accidentally omitted or not secured properly, the spring is likely to sag in that location. Furthermore the links sometimes work loose when the spring is in use. Such defects are very expensive to correct after the spring has been upholstered.

The principal object of this invention is to provide a spring construction of high quality which can be manufactured with a minimum of hand labor and consequently at lower cost than previous constructions. Another object is to produce a spring which is firmer and more durable than other types of springs. Other objects, advantages, and novel features will be apparent from the following description.

In the top assembly of the spring here disclosed, a prefabricated mat or grid takes the place of the individual top wires. The mat is made of a first set of wires running transversely and a second set of wires running longitudinally and secured to the first set at their intersections. The wires are spaced so that two of each set pass over the top turns of each transverse and longitudinal row of coils. At the location of each coil, the wires have downward crimps which engage inside the top turn of the coil. The mat is secured in place by straight locking wires which pass under the top turns of the coils and through the crimps. The ends of the locking wires are clinched around the border wire of the spring, replacing the usual clips. In a modified form of the device prefabricated strips consisting of two parallel wires, connected together at intervals, are used instead of the mat. The parallel wires of a strip pass over the top turns of adjacent rows of coils and are locked in by locking wires running at right angles to the strips.

In the drawings illustrating the invention:

FIG. 1 is a fragmentary plan view of the top assembly of a box spring or inner spring constructed according to the invention;

FIG. 2 is a fragmentary perspective view of an inner spring in the process of assembly;

FIG. 3 is a fragmentary perspective view of the inner spring at a later stage in the assembly;

FIG. 4 is an enlarged fragmentary cross-section taken along line 4—4 of FIG. 1;

FIG. 5 is an enlarged fragmentary cross-section taken along line 5—5 of FIG. 1;

FIG. 6 is a fragmentary plan view of the wire mat used to make the inner spring of FIGS. 1–5;

FIG. 7 is a fragmentary plan view of a spring top assembly made with a modified form of mat;

FIG. 8 is a fragmentary plan view of a modification of the top assembly; and FIGS. 9, 10 and 11 are fragmentary plan views illustrating alternative locking arrangements.

The bottom part of the spring assembly may be constructed in any convenient manner. The spring is here shown as made up of rows of coils 10. The bottom assembly consists of a first set of bottom wires 11 and second set of bottom wires 12 running perpendicular to the first set. At the intersections of the sets of wires, wires 11 are crimped upwardly and wires 12 are crimped downwardly at their intersections so that wires 11 pass over wires 12, leaving enough space between them to accommodate the bottom turn 10a of a coil. The bottom turn is engaged over the wire 11 on two opposite sides of the intersection and under wires 12 on the other two opposite sides of the intersection. The ends of wires 11 and 12 are clinched around a bottom border wire 13 which runs continuously around the outer edge of the spring at the bottom. This bottom construction is typical for an inner spring for a mattress, cushion, or similar upholstered article. In the case of a box spring, the coils may be mounted on a rigid bottom frame, usually made of wood.

The top assembly of the inner spring includes a mat, generally indicated by the numeral 14 and illustrated by itself in FIG. 6, consisting of a first set of wires 15 and a second set of wires 16 running at right angles to the first set. The wires are welded or similarly secured together at all their intersections 17. The mat may be made of wire of somewhat lighter gage than the coils. At the positions of the coils 10, usually in every other space in both directions of the mat, the wires have downward crimps 18 and 19 respectively disposed centrally between adjacent intersections. These crimps engage inside, and project below the top turn 10b of a coil when the mat is laid over the coil assembly.

At the position of each row of coils 10, in the direction parallel to wires 15, is a locking wire 20, which passes under the top turn 10b of each coil in the row and through the crimps 19 of wires 16 disposed in the coil. The outer ends 20a of wires 20 are clinched around a border wire 21, which runs continuously around the outer edge of the spring at the top.

At the position of each row of coils in the direction parallel to wires 16 is another locking wire 22 which passes under the top turns of the coils and through the crimps 18 of wires 15. The outer ends 22a of wires 22 are also clinched around the border wire. The border wire 21 is rounded at the corners of the spring to approximately the radius of the top turn of the corner coil, and the corner 14a of the mat is bent down around the border wire at that point.

To assemble the spring, the coils 10 are assembled onto the bottom wires (or frame in the case of a box spring) in the usual manner. A mat 14, prefabricated to fit the size and coil layout of the spring is laid over the top with the crimps engaged in the coils. The sets of locking wires are pushed straight through the aligned crimps in both directions. FIG. 2 shows wires 20 being inserted, and FIG. 3 shows wires 22 being inserted. Either set may be inserted first, and the wires first put in tend to drop to the bottom of the crimps so that the second set of wires slide readily over the first at their intersections in the centers of the coils. To complete the spring, the top border wire 21 is put in place, the ends of wires 20 and 22 are clinched around it, and the corners 14a of the mat are bent around the top border wire at the corners.

The spring shown in FIG. 7 is similar in all respects to that shown in FIG. 1, except that additional wires 23 and 24 have been added to the mat 14 in the spaces between the coils. These wires are welded or otherwise secured at their intersections with the other wires of the mat. Wires 23 and 24 provide additional support for the padding or cover of the spring in the regions between the coils. The spring is assembled as previously described, by laying the mat over the coil assembly and running the locking wires 20 and 22 between the aligned crimps 19 and 18 respectively and top turns 10b of each transverse and longitudinal row of coils.

The mat shown in FIG. 8 is composed of strips, generally indicated by the numeral 25. Each strip consists of a pair of spaced parallel wires 26 and 27, held together at intervals by pairs of cross-wires 28 and 29 which are welded to wires 26 and 27. The latter wires have crimps 26a and 27a, disposed between successive pairs of the cross-wires. The strip material may be manufactured in continuous form, in the proportions desired, and cut to length as needed.

A strip 25 is laid over the spring assembly between the rows of coils, in one direction, with the crimps 26a and 27a engaged inside the top coils 10a of adjacent rows. Locking wires 30 are then inserted, in the direction transverse to the strips. The locking wires pass under the top coils 10b and over the crimps 26a and 27a, and have their ends 30a clinched around the top border wire 21. The ends 26b and 27b of wires 26 and 27 are also clinched around the top border wire. Clips 31 are used to secure the corner coils, and the edge coils which lie between strips 25, to the top border wire.

FIGS. 9, 10 and 11 show fragments of top assemblies using a mat similar to that shown in FIG. 1, composed of longitudinal wires 32 and transverse wires 33 welded together at their intersections. The mat wires are straight and are spaced by the width of the top turns 10b of the coils. In FIG. 9 the mat wires are secured to the coil by short pieces of pre-formed helically wound wire 34 which are worked around the mat wires and the coil by rotation. In FIG. 11 the mat wires are secured to the coil by clips 35. In FIG. 10, short pieces of wire 36 are wrapped around the mat wires and the coil by means of a suitable tool.

The mat, in its first two forms, can be readily manufactured by automatic machinery, either in continuous sheet form or cut to size. The locking wires can be run in by hand in much less time than is required to assemble the top wire and link construction. The clips at the border are eliminated, and there are fewer parts to handle. By way of comparison, the assembly of a four coil section such as that shown in FIG. 7 involves only placement of the mat and border wire, and insertion of four locking wires. An equivalent assembly in the usual link construction requires placement of seven individual top wires, hooking in both ends of four links, and the application of two clips on the border coils.

As the insertion of the locking wires is a straight line operation, it can be readily done by automatic machinery either by inserting single wires in sequence or by inserting groups of wires, suitably spaced, in one operation.

The strip form of mat has most of the advantages of the first two forms and is easier to manufacture and handle than a full width mat.

The finished spring in all forms is firmer than a spring of linked construction, provides a more uniform foundation for padding or covering, and has fewer loose parts to cause rattling or creaking. The coils are permanently locked together at the top so that they maintain their proper positions. The new construction thus makes it possible to manufacture a superior spring at lower cost.

It is understood that variations of the top assembly are included within the scope of the invention.

What is claimed is:

1. A spring assembly for furniture comprising a plurality of spring coils arranged in longitudinal and transverse spaced rows, a set of longitudinal pairs of wires, each pair overlying one of said longitudinal rows, a set of transverse pairs of wires each pair overlying one of said transverse rows and intersecting said longitudinal wires, said sets of wires being fixedly joined together at their intersections and each wire having crimps engaged with a coil intermediate adjacent intersections, a plurality of longitudinal locking wires one passing through the crimps in the transverse wires engaged in each of said longitudinal rows of coils and a plurality of transverse locking wires one passing through the crimps in the longitudinal wires engaged in each of said transverse rows of coils.

2. A spring assembly as described in claim 1 having open spaces between the pairs of longitudinal and transverse wires.

3. A spring assembly as described in claim 1 having an additional longitudinal wire disposed between each pair of longitudinal wires, and an additional transverse wire disposed between each pair of transverse wires.

4. A spring assembly for furniture comprising a plurality of spring coils arranged in rows and having top turns, a mat overlying said coils and including a pair of spaced parallel wires and a pair of spaced transverse wires having intersections with said parallel wires and fixedly attached thereto, said parallel wires having portions intermediate said intersections disposed tangentially with respect to the top turns of said coils, and locking means releasably connecting said portions to said top turns.

5. A spring assembly as described in claim 4, said portions having crimps engaged with said top turns and said locking means comprising straight wires passing through said crimps.

6. A spring assembly as described in claim 4, said parallel wires passing over said top turns and having crimps extending below said top turns, and said locking means comprising straight wires passing under said top turns and through said crimps.

7. A spring assembly as described in claim 4, said portions being disposed on opposite sides of one of said top turns, said transverse wires also having portions intermediate said intersections disposed tangentially with respect to the same top turn on opposite sides thereof and releasably connected thereto.

8. A spring assembly as described in claim 4, said mat comprising strips composed of said parallel wires and said transverse wires, said strips being disposed between adjacent rows of coils and said portions being releasably connected to top turns of coils in adjacent rows.

References Cited by the Examiner
UNITED STATES PATENTS

| | | | |
|---|---|---|---|
| 790,614 | 5/1905 | Bridgewater | 5—277 |
| 853,380 | 5/1907 | Stedman | 5—275 |
| 1,172,594 | 2/1916 | Hancock | 5—276 X |
| 3,032,782 | 5/1962 | Sharfe et al. | 5—351 X |
| 3,063,472 | 11/1962 | Winter | 5—276 X |

FRANK B. SHERRY, *Primary Examiner.*

R. D. KRAUS, *Assistant Examiner.*